US006769802B2

United States Patent
Loppoli

(10) Patent No.: US 6,769,802 B2
(45) Date of Patent: Aug. 3, 2004

(54) DEMOUNTABLE CUTTING AND MIXING WAGON

(76) Inventor: Giuseppe Loppoli, Via Regina Margherita, 32/A-35010 Grantorto (IT)

( * ) Notice: Subject to any disclaimer, the term of this patent is extended or adjusted under 35 U.S.C. 154(b) by 42 days.

(21) Appl. No.: 10/333,723

(22) PCT Filed: Jul. 25, 2001

(86) PCT No.: PCT/EP01/08571

§ 371 (c)(1),
(2), (4) Date: Jan. 24, 2003

(87) PCT Pub. No.: WO02/11524

PCT Pub. Date: Feb. 14, 2002

(65) Prior Publication Data

US 2003/0179649 A1 Sep. 25, 2003

(30) Foreign Application Priority Data

Aug. 4, 2000 (IT) .................................... VI20000057 U

(51) Int. Cl.⁷ ................................................. A01K 5/00
(52) U.S. Cl. ...................... 366/349; 366/297; 366/603; 241/101.76
(58) Field of Search ................................ 366/349, 603, 366/297, 318, 312, 314; 198/567, 662; 460/23; 241/101.76, 101.8

(56) References Cited

U.S. PATENT DOCUMENTS

| 1,661,863 | A |   | 3/1928  | Wine |
|-----------|---|---|---------|------|
| 4,460,214 | A |   | 7/1984  | Kuhns |
| 4,712,922 | A | * | 12/1987 | Feterl .......................... 366/297 |
| 4,756,626 | A | * | 7/1988  | Neier .......................... 366/279 |
| 4,799,800 | A | * | 1/1989  | Schuler ........................ 366/603 |
| 4,951,883 | A | * | 8/1990  | Loppoli et al. ........... 241/101.8 |
| 5,356,054 | A | * | 10/1994 | Loppoli et al. ........ 241/101.76 |
| 5,395,286 | A | * | 3/1995  | Sgariboldi ................... 366/603 |
| 5,630,665 | A | * | 5/1997  | VanBruggen ............... 366/603 |
| 5,645,345 | A | * | 7/1997  | O'Neill et al. .............. 366/603 |

FOREIGN PATENT DOCUMENTS

| EP | 0 029 095  | 5/1981 |
| EP | 0 612 465  | 8/1994 |
| WO | 98 09890   | 3/1998 |

* cited by examiner

Primary Examiner—Tony G. Soohoo
(74) Attorney, Agent, or Firm—Dykema Gossett PLLC

(57) ABSTRACT

A body (1) for cutting and mixing wagons for plant products is disclosed, comprising a base (2) with a plurality of walls (3a, 3b, 3c) defining a room (4) adapted to receive the plant products to be cut and mixed through one or more screws arranged inside the body (1). The walls (3a, 3b, 3c) are removably connected to each other and to the base (2) through connection means (7, 8).

7 Claims, 7 Drawing Sheets

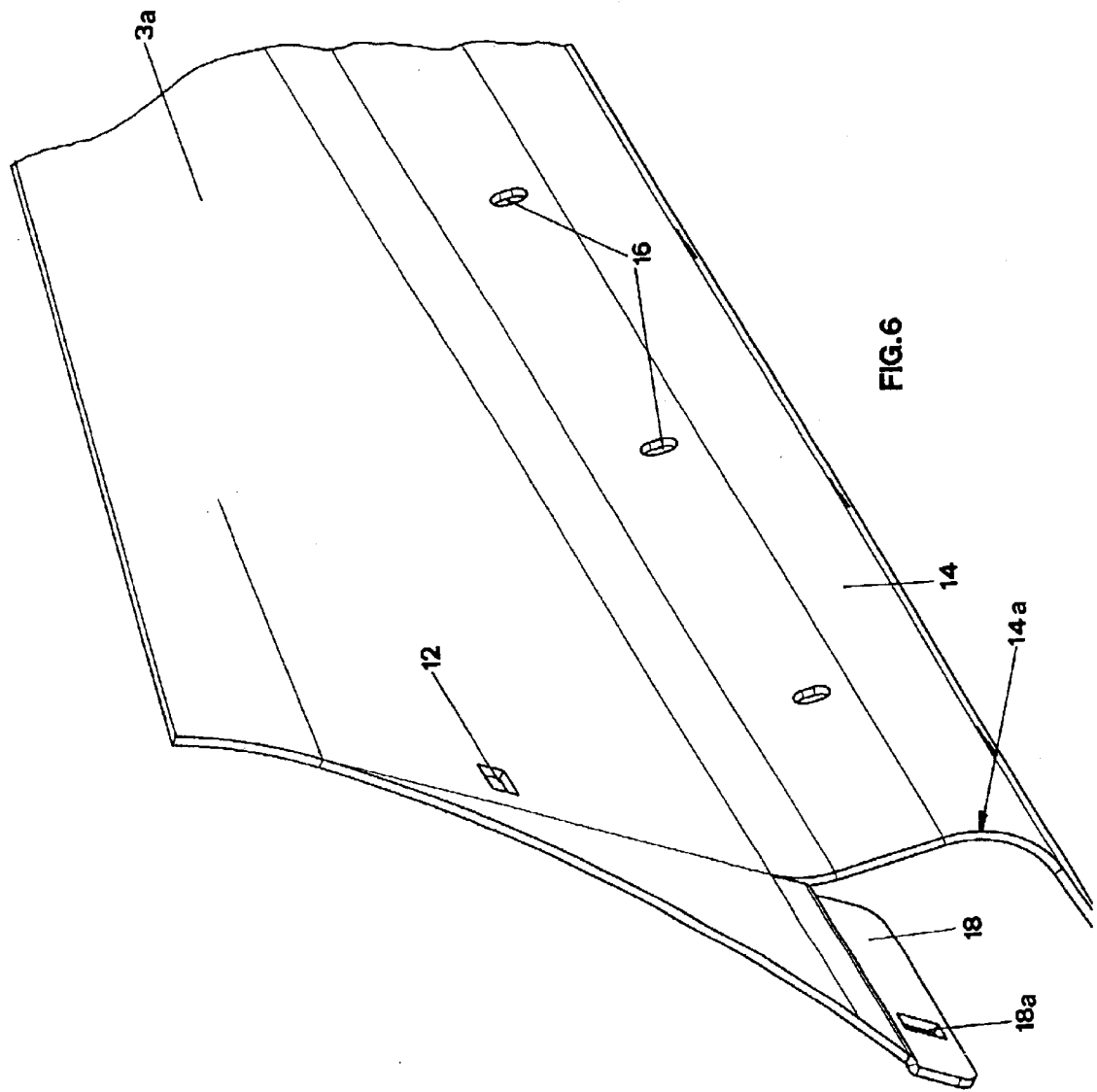

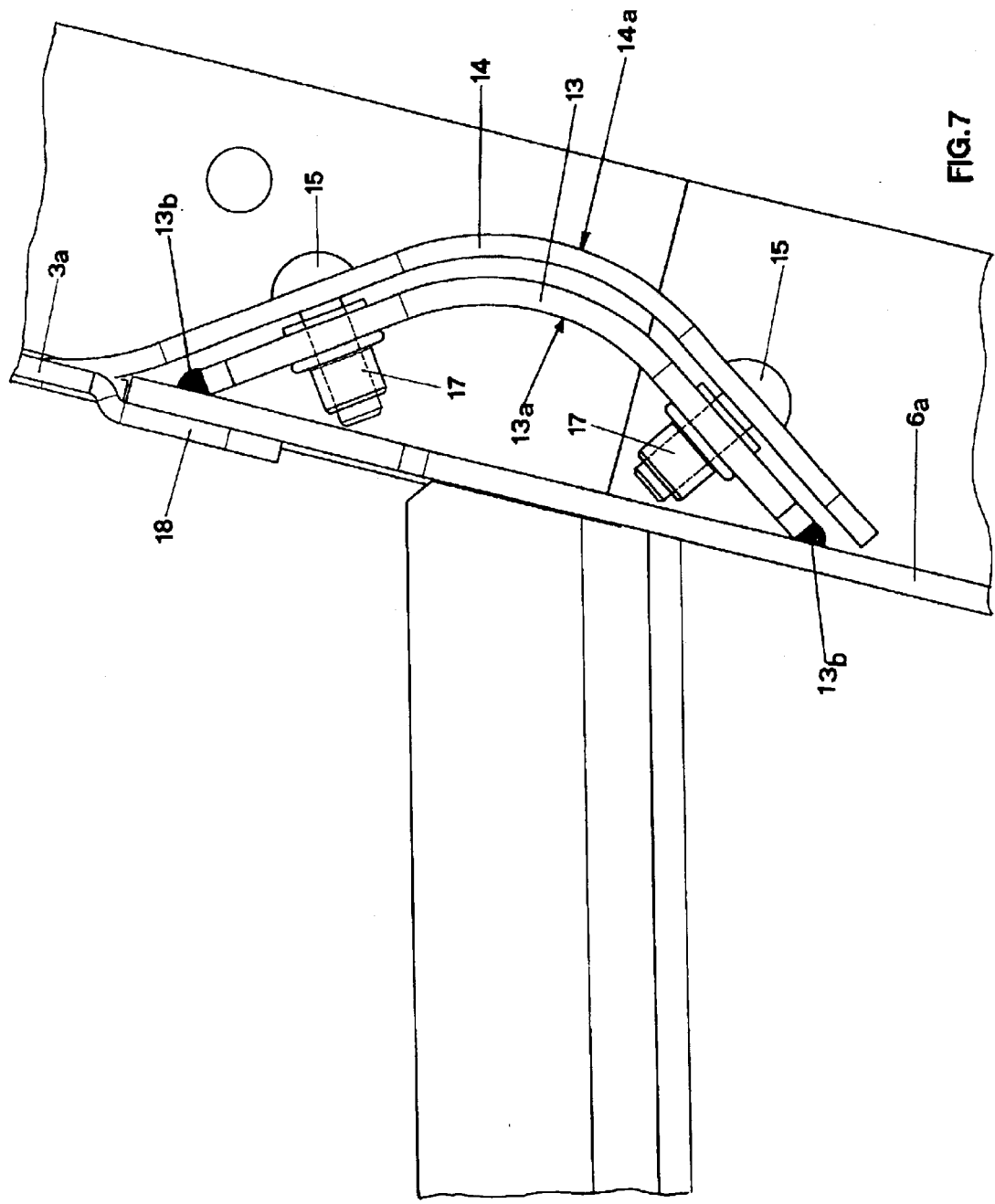

DEMOUNTABLE CUTTING AND MIXING WAGON

BACKGROUND OF THE INVENTION

The present invention relates to a demountable cutting and mixing wagon of the kind used in agriculture and zootechniques for grinding and mixing plant products.

SUMMARY OF THE INVENTION

It is well known that in agriculture and zootechniques the waste plant products arising for instance from plant pruning, vegetable or fruit harvesting or forage and ensiled grass or straw, are cut and mixed to produce blends that are used as compost or animal food.

The cutting and mixing wagons of the prior art used for the above mentioned objects, comprise a body of general prismatic shape, provided at the top with an opening for loading the products to be cut and mixed and a side opening for discharging the cut and mixed material.

For the grinding and mixing operation the body is provided at the bottom with a couple of screws parallel to each other and arranged longitudinally, held by support means and rotated by a driving unit.

Each screw consists of a cylindrical core on which two spirals are wound, having opposite winding directions converging to the center.

The screws are also provided on their periphery with a plurality of removable cutting members for grinding the product.

A drawback of the cutting and mixing wagons of the prior art consists in that the body once assembled has a considerable overall dimension.

This makes the transport operations difficult and also expensive, especially when the wagon is shipped through a container or truck which have such a size as to be able to contain at most a couple of cutting and mixing wagons.

One can easily understand that the transport cost weighs considerably upon the cost of the cutting and mixing wagon, more particularly when the wagon has to be shipped far away or overseas.

The present invention aims at overcoming said drawback.

The object of the invention is to provide a body for cutting and mixing wagons that can be demounted into its components, so as to require less space when transported.

The above object is attained by a body for cutting and mixing wagons for plant product, the main features of which are according to the main claim.

According to the preferred embodiment herein described, the body base comprises a bottom surface bounded by boards for defining a room of a generally parallelepipedal shape in which the screws are arranged.

Preferably the bottom is so shaped as to define a couple of juxtaposed troughs, one of said screws being arranged in each trough.

The walls defining the body room are removably fixed to each other and to the base defining boards through connection means.

BRIEF DESCRIPTION OF THE DRAWINGS

The above mentioned objects and advantages will be better understood from the following description of a preferred embodiment of the invention which is given as an illustrative and non-limiting example with reference to the accompanying sheets of drawings in which:

FIG. 6 shows the detail of the connection means between the upper part of the body illustrated in FIG. 2 and one of the walls.

FIG. 7 shows a fragmentary view of the side wall fixed to the side board.

DETAILED DESCRIPTION

Figure 1:
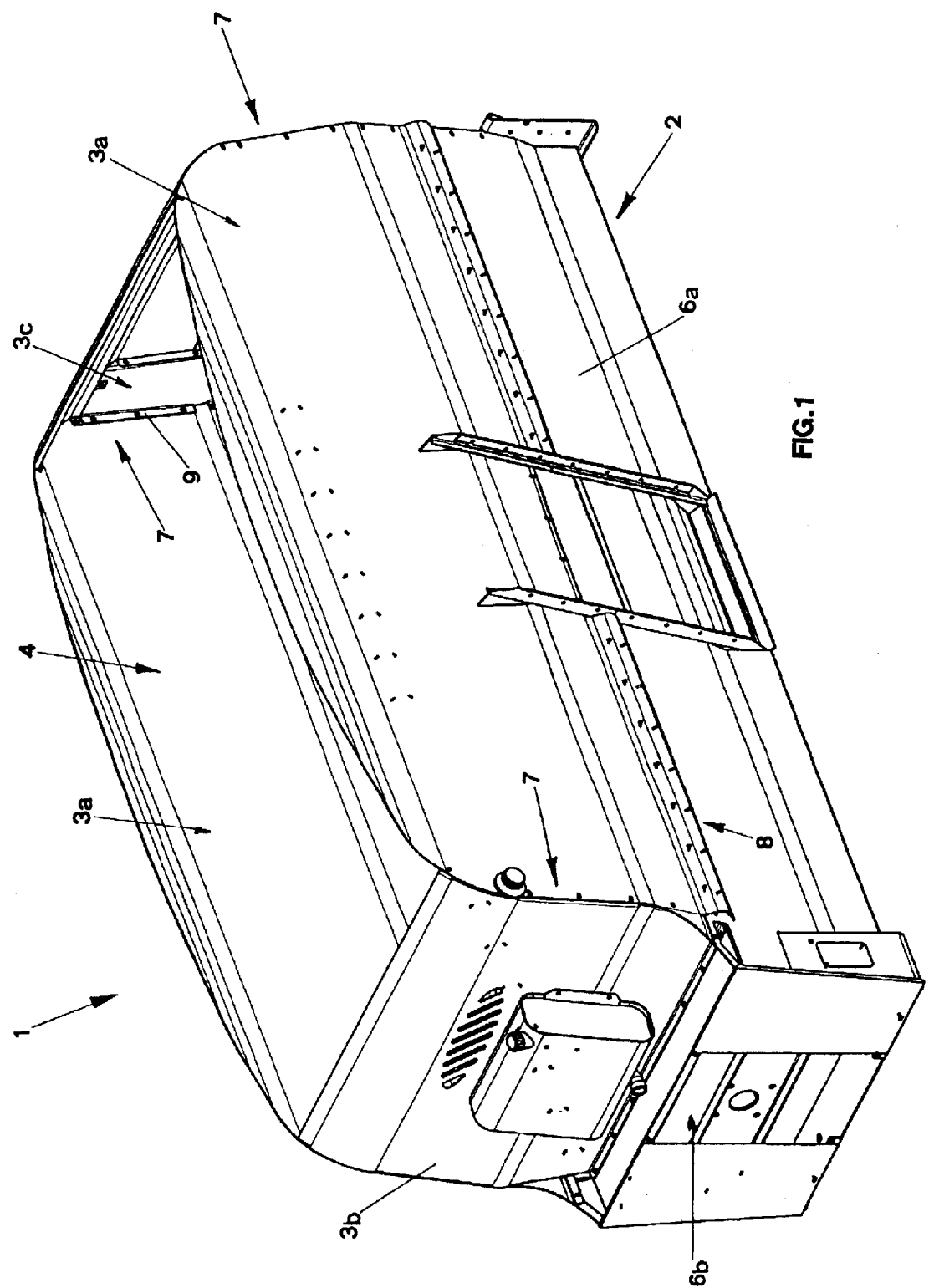
FIG. 1 is an isometric view of the assembled body of the invention.

As shown in FIG. 1 the wagon body of the invention generally indicated with reference numeral 1 comprises a base 2 with a plurality of walls 3 defining a room 4 in which the products to be cut and mixed through screws arranged in base 2 are received, said screws being not shown in the drawing but of a kind known per se.

Figure 2:
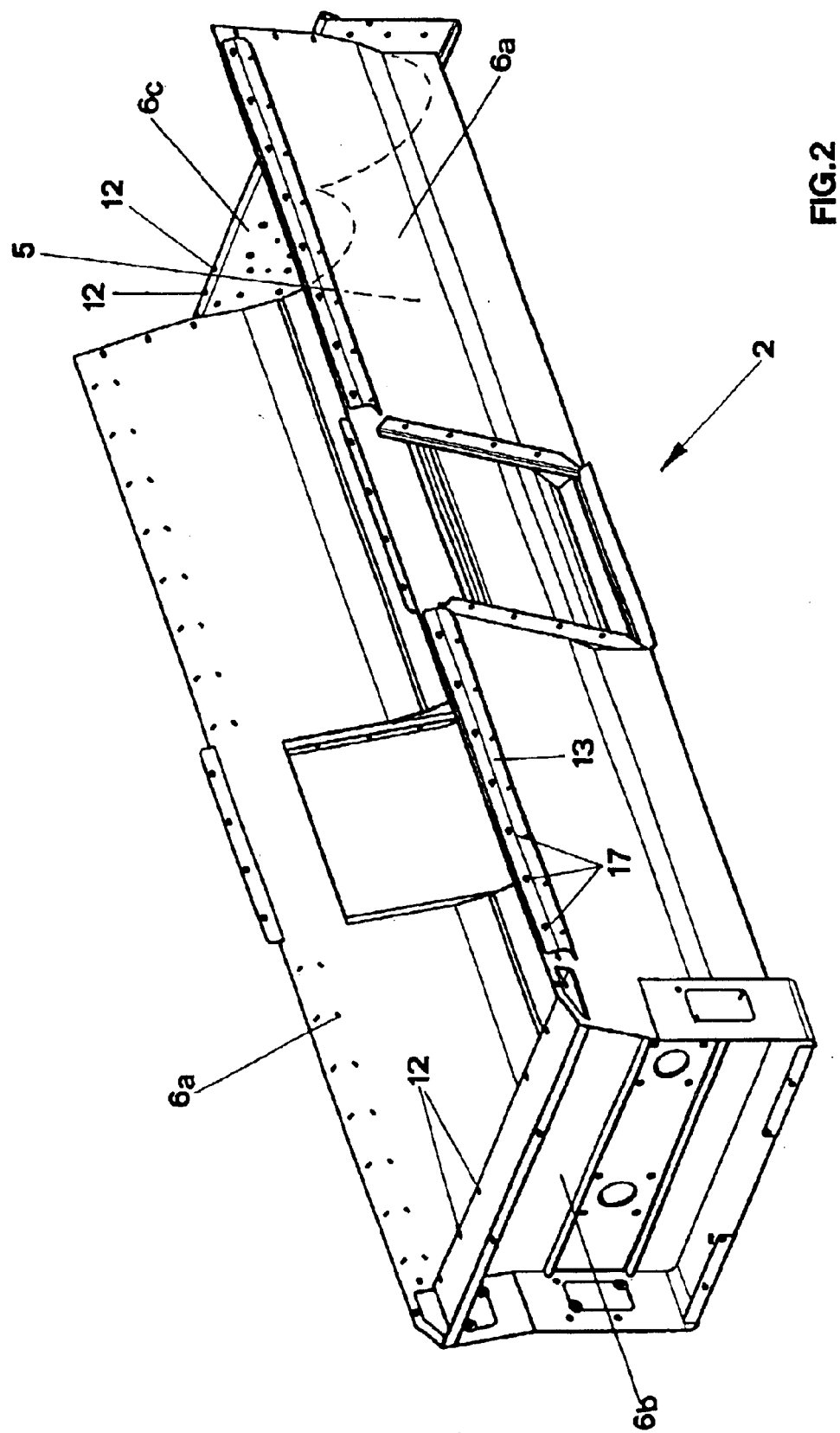
FIG. 2 shows the lower part of the body of FIG. 1.

As to said base 2, FIG. 2 shows that said base consists of a bottom surface 5 possibly so shaped as to match the contour of the screws, bounded by side boards 6a, a front board 6b and a rear board 6c, said boards defining a room of a generally parallelepipedal shape in which the screws are arranged.

As to the walls 3, FIG. 1 shows that said walls comprise a couple of side walls 3a, a front wall 3b and a rear wall 3c, which according to the invention are removably connected to each other and to the base through connection means.

More particularly the rear wall 3c is preferably made of several portions.

With reference to the FIGS. of the drawings and more particularly to FIG. 1, one can see that said connection means comprise: first connection means generally indicated with numeral 7 removably connecting the front wall 3b and the rear wall 3c to the corresponding front board 6b and rear board 6c as well as to the side walls 3a; second connection means generally indicated with numeral 8 removably connecting the side walls 3a to the corresponding side boards 6a.

Figure 3:
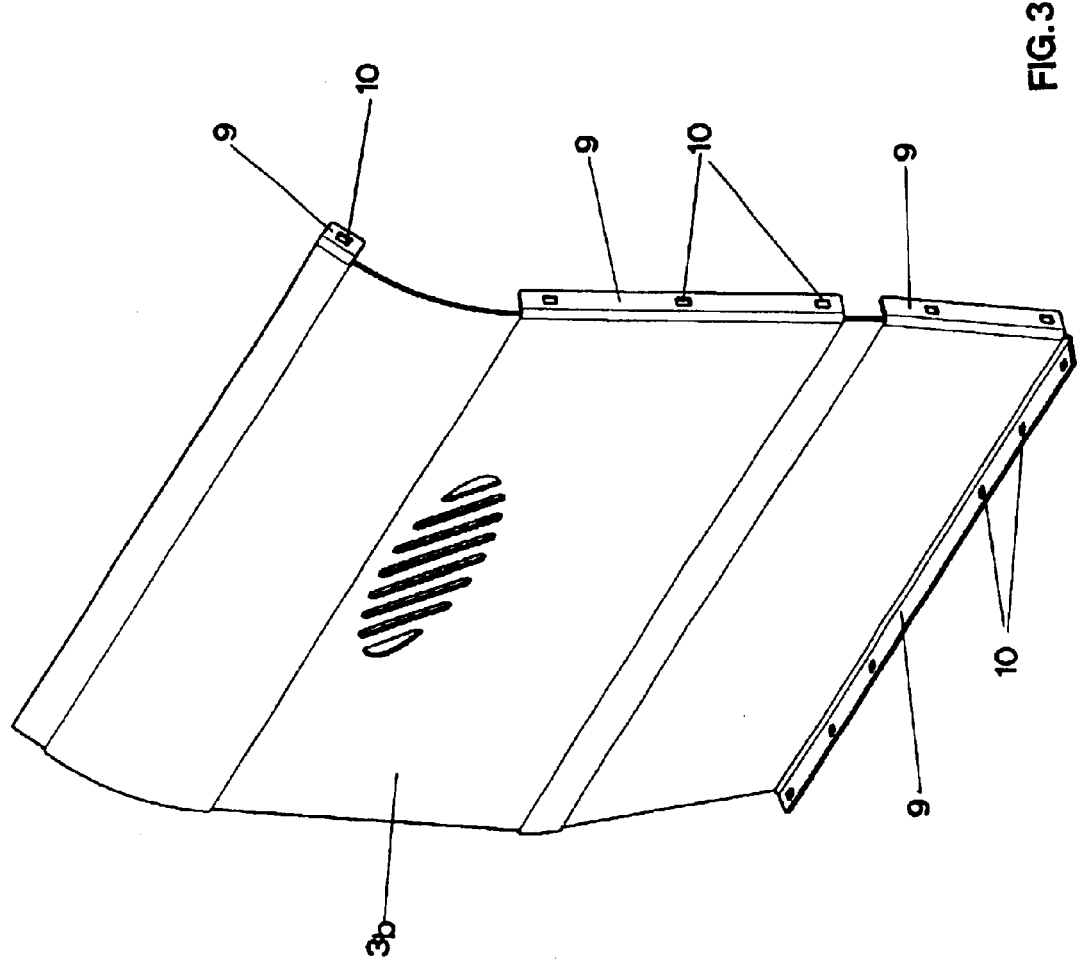
FIGS. 3 and 4 show the walls of the body of FIG. 1.
Figure 4:
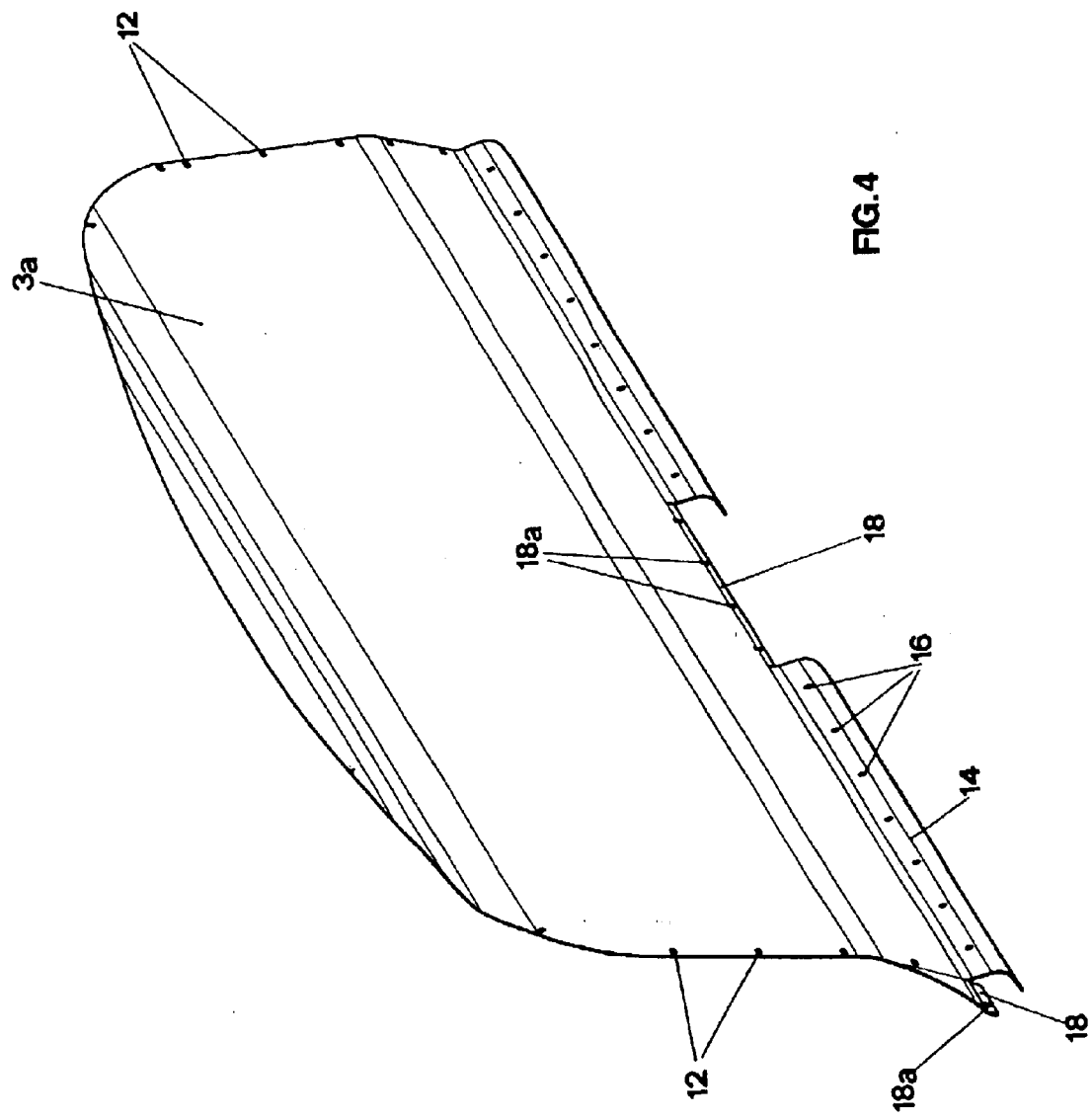
Figure 5:
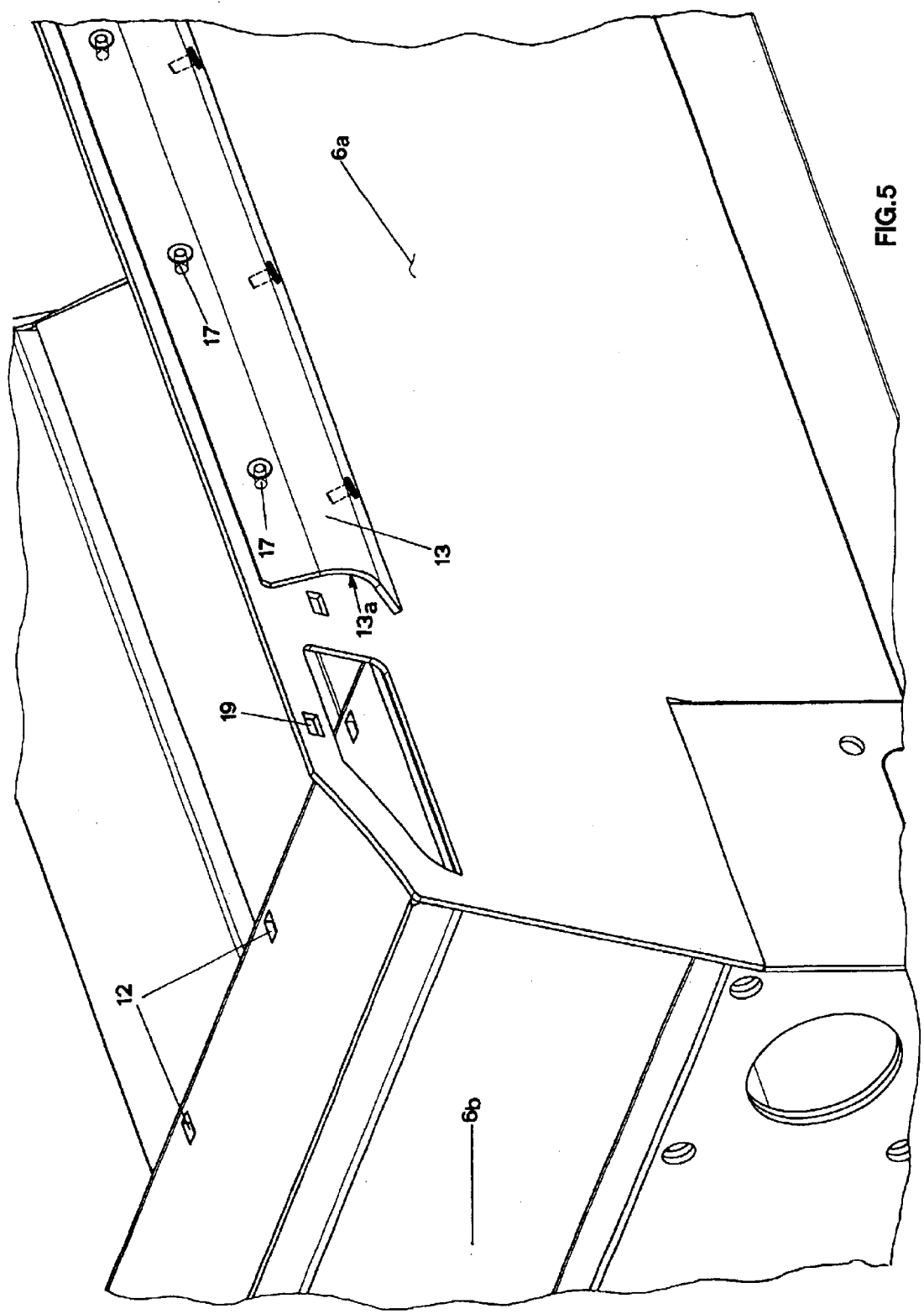
FIG. 5 shows a detail of the body illustrated in FIG. 2.

With regard to the first connection means 7, FIGS. 2 and 3 show that they consist of fins 9 made by bending generally at right angles the lower and side edges of each front wall 3b and rear wall 3c.

Through holes 10 are made in said fins and are adapted to receive fastening means consisting of screws or rivets, which are inserted into corresponding further holes 12 made in the front board 6b and rear board 6c and the side edges of the side walls 3a.

On the contrary with regard to the second connection means generally indicated with numeral 8, one can see particularly with reference to FIGS. 4 to 7 that they comprise a first shaped edge 13 longitudinally made on each side board 6a and provided with an outwards convex surface 13a adapted to match the corresponding concave surface 14a of a second shaped edge 14 made longitudinally on the lower edge of each side wall 3a.

Each first shaped edge 13 is preferably fixed to the corresponding side board 6a through weldings 13b.

Each side wall 3a is fixed to each side board 6a at said shaped edges 13, 14 through fastening means consisting of bolts 15 passing through suitable holes 16 made in the second shaped edge 14 and threaded to corresponding nuts 17 previously arranged on the first shaped edge 13 during the constructional stage as shown in FIG. 7.

Plain flanges 18 are provided in the side walls 3a and have one or more through holes 18a matching corresponding holes 19 provided in the corresponding side board 6a so as to allow insertion of further fastening means such as screws for further stiffening the connection.

From the foregoing one can see that the wagon body 1 can be easily assembled or disassembled.

The various elements constituting the wagon body, when disassembled, may be arranged in a horizontal position stacked on one another inside the base 2 that forms in this way the element containing both the screws and the walls of the body.

In this way the overall dimensions are considerably reduced and the wagon body may be easily transported requiring a considerably lower room in comparison with the space that the body would require if the relevant wagon is shipped in the assembled condition.

It is clear that in the operative stage the wagon body of the invention and more particularly the connection means for its elements may have shapes different from those described and shown in the drawings.

Moreover also the elements constituting the wagon body may have shapes different from those described and illustrated in the drawings.

It is however to be understood that such possible different embodiments when falling within the scope of the appended claims are to be considered as covered by the present patent.

What is claimed is:

1. A body for cutting and mixing wagons for plant products comprising:

a base having a bottom surface bounded by boards, said base defining a room of generally parallelepipedal shape where ne or more screws are arranged for cutting and mixing said vegetable fibrous products;

a chamber defined by a plurality of walls suited to receive the vegetable fibres to be cutted and mixed, said walls being removably connected together by first connection means and said boards being removably connected to said walls by second connection means wherein said second connection means consist of a first shaped edge longitudinally made on each side board and adapted to match a corresponding second shaped edge longitudinally made on the lower edge of each side wall, said shaped edges being arranged for receiving fastening means, said first shaped edge having an outward convex surface matching a corresponding concave surface of said second shaped edge.

2. The body according to claim 1, wherein said boards comprise a front board and a rear board between which a couple of side boards parallel to each other are arranged, and said walls comprising a front wall and a rear wall between which a couple of side walls parallel to each other are arranged.

3. The body according to claim 1, wherein said first connection means consist of fins made on each front wall and rear wall, said fins being provided with through holes matching corresponding holes made in the front board, rear board and the side edges of said side walls, said hole being adapted to receive fastening means.

4. The body according to claim 1, wherein said first shaped edge is provided with nuts so arranged as to match corresponding holes made in said second shaped edge, said holes and said nuts being adapted to receive said fastening means.

5. The body according to claim 4, wherein each of said first shaped edges is fixed to the corresponding side board through weldings.

6. The body according to claim 1, wherein said side walls are provided with plain flanges, said plain flanges being provided with one or more through holes matching corresponding holes made in the corresponding side board, said holes being adapted to receive fastening means.

7. The body according to claim 1, wherein said fastening means are screws.

* * * * *